(12) United States Patent
Comstock

(10) Patent No.: X4967
(45) Date of Patent: Jan. 21, 1828

(54) WATER PROOF LEATHER & CLOTH

(76) Inventor: J.L. Comstock

J. L. Comstock.

Letters Patent

The Schedule referred to in these Letters patent and making part of the same containing a description in the words of the said J. L. Comstock himself of his discovery being a method of making waterproof cloth leather for cloaks, [illegible] hose, carriage tops carriage boots, & curtains life preservers, boots, shoes, balloons, gas tubes mail & travelling bags and for other purposes whereof the subscriber claims for himself the discovery

---

It has long been a desideratum in the arts and comforts of life to obtain some cheap substance which being applied to cloth and leather would render them impervious to water, without destroying their flexibility or other good qualities. For this purpose India Rubber or Gum Elastic has been subjected to a great variety of experiments as the substance by means of which such an object was most likely to be attained. But the difficulty has hitherto been to find a cheap solvent which after reducing the gum to a state in which it could be spread with a brush would again evaporate and leave it in its original dry [illegible] and elastic state.

Sulphuric ether especially when washed has long been a known solvent of this gum but the difficulty of spreading the solution owing to the sudden evaporation of the ether together with its high price will always forbid its employment for common purposes. Naphtha or the oil distilled from tar obtained by coking of bituminous coal, is also a solvent of India Rubber but this solution is entirely unfit to be employed on articles for personal use on account of the very unpleasant smell which it emits and which it retains even for years.

The Seneca oil and the Naphtha which may be distilled from the Barbadoes tar though of them solvents are equally objectionable on the same account.

Spirit of turpentine it is well known to Chemists, and perhaps to others, is a solvent of gum Elastic, and many experiments have been made to bring this solution to a state in which it might be employed extensively for useful purposes, but it is believed that heretofore no valuable use has been made of this composition. The Subscriber has however discovered that this composition viz Gum Elastic dissolved in spirit of turpentine may be employed for many valuable purposes when applied according to the following specifications Specification 1. Take a sheet or side of leather and if it is thicker on the flesh side, shave off with a currier's knife the surface of the opposite or grain side so that the water proof [illegible] may adhere the stronger. If the skin is blacked on the smooth or grain side the shaving is unnecessary. Next let the skin be moistened, and extended with nails or otherwise, on a smooth [illegible] surface, and when it is dry spread with a brush on the [illegible] side of the leather a solution of gum elastic in spirits of turpentine. When one coat is dry, spread another, and perhaps a third when the surface will be completely covered with a shining coat of gum elastic. Then extend a piece of cotton or other cloth on bars with tenter hooks, and on one side lay two or three coats of the solution waiting as before for each coat to dry before another is applied. Lastly when the two coated surfaces are nearly dry bring them into close contact by passing the leather and cloth, coat to coat, between a pair of wooden or iron rollers. This leather is employed in the manufacture of shoes and other purposes In preparing the leather for gentlemens boots only the feet are made water proof Spec. 2d To make water proof boots let the fronts be blacked or not cut in the usual manner, then let the part which forms the foot be [illegible] or shaved on the inside, as directed above. Then cut the lining of buckskin or other leather of the size of the foot of the boot letting it come up to the ancle. Next spread the solution on the side which has been shaved, and do the same to the rough side of the lining, and when nearly dry unite these two surfaces by passing them through the rolling press, in the making, let the stitches of the insole be covered with the solution and let there be inserted between the inner and outer soles a lining of water proof leather laying the [illegible] side next the insole.

Spec. 3. To make water proof cloth extend the fabric on bars with tenter hooks and apply the solution as above described to one side of each piece until the surface of each presents a shining appearance and the threads are accurately covered; then bring the two coated surfaces into close union by passing the cloth between a pair of rollers.

Spec 4. To make water proof shoes of Prunella, proceed as in spec 4 and employ for insides or as a lining for the Prunella, thin cotton or linnen cloth, and in making, cover the stitches of the insole, and insert a water proof lining of leather as directed for the boots Spec 5th In the making of water proof clothing, cut out, and sew the garment together as usual; then protect the seams by sticking strips of water proof cloth over them on the inside By following these directions boots & shoes of leather or cloth and clothing of all kinds may be rendered entirely impervious to water, the articles still retaining in a good degree their flexibility. It is found also by experience that boots and shoes of this kind, are much more durable than those made in the ordinary manner

I claim as my discovery; the application of gum elastic dissolved in spirits of turpentine for the purpose of making water proof leather and water proof cloth, as described in the foregoing specification

Witnesses

Henry [illegible]

[illegible]

[illegible] Comstock

1149

Ex. L.S.